Nov. 5, 1968    F. KALWAITES    3,408,776
METHOD FOR PRODUCING PERFORATED SHEET MATERIALS
Filed March 5, 1965    3 Sheets-Sheet 1

INVENTOR
FRANK KALWAITES
BY
ATTORNEY

Nov. 5, 1968  F. KALWAITES  3,408,776
METHOD FOR PRODUCING PERFORATED SHEET MATERIALS
Filed March 5, 1965  3 Sheets-Sheet 2

INVENTOR.
FRANK KALWAITES
BY
ATTORNEY

Nov. 5, 1968   F. KALWAITES   3,408,776
METHOD FOR PRODUCING PERFORATED SHEET MATERIALS
Filed March 5, 1965   3 Sheets-Sheet 3
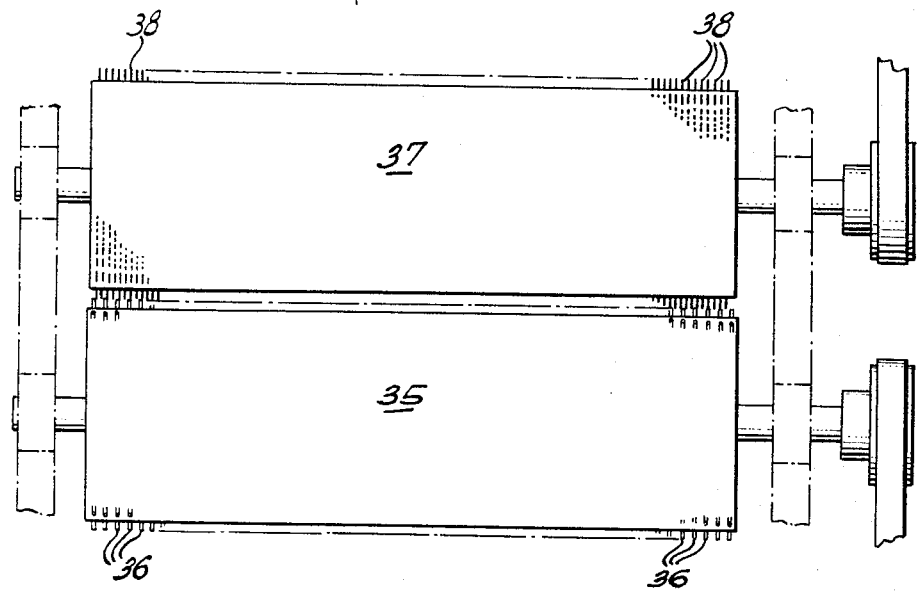
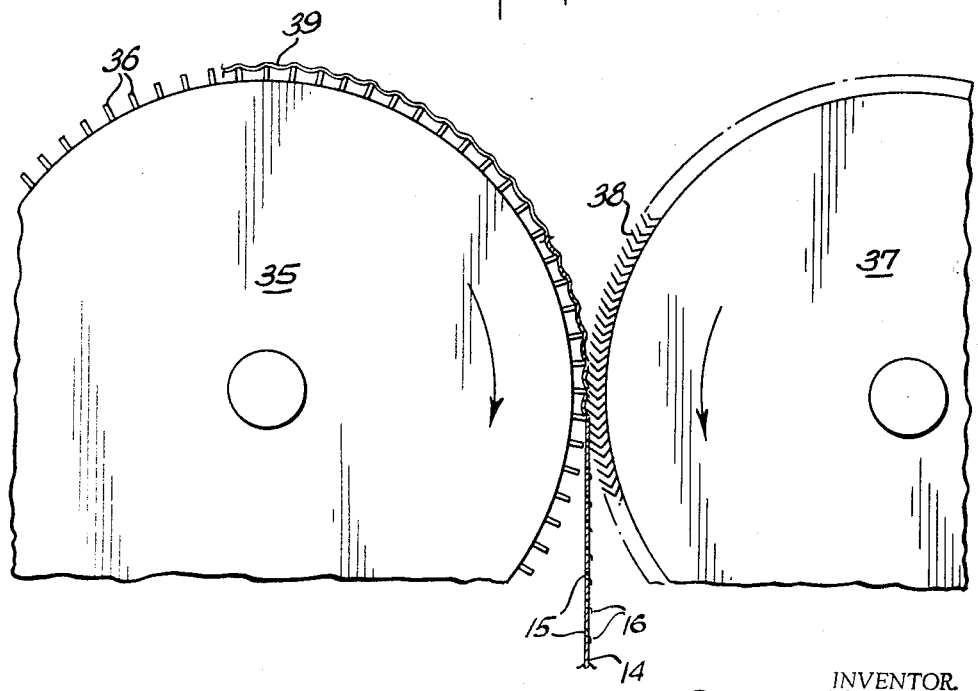
INVENTOR.
FRANK KALWAITES
ATTORNEY

United States Patent Office 3,408,776
Patented Nov. 5, 1968

3,408,776
METHOD FOR PRODUCING PERFORATED SHEET MATERIALS
Frank Kalwaites, Somerville, N.J., assignor to Johnson & Johnson, a corporation of New Jersey
Filed Mar. 5, 1965, Ser. No. 437,469
2 Claims. (Cl. 51—324)

ABSTRACT OF THE DISCLOSURE

A method for perforating sheet material comprising supporting the material at spaced areas over one surface and allowing the material to sag between supported areas. Abrading the opposite surface of the supported areas to form perforations in the sheet material.

This invention relates to new methods for producing perforated sheet material, and more particularly to perforated sheet material in which the perforations are formed by a combination of abrading and shredding of minute areas of sheet material to form apertures in the same.

There are various known techniques for producing perforated sheet material, such as by completely cutting out areas and removing these areas to form the perforations or by partially cutting portions and bending these partially cut portions back to form a flap and an adjoining perforation. Furthermore, there are techniques, when thermoplastic materials are used, of heating small areas of the sheet material to form perforations. All of these prior art perforated sheet materials have their various advantages and disadvantages. For example, those where only a portion of the area is cut and bent back to form a flap have the advantage that when used in combination with a loose batt of short fibers or wood pulp, the flap tends to stabilize the batt; however, these flaps very often fold back and close up the hole, and hence, reduce the desired permeability of the sheet material. If the area is completely removed to form a clean hole, two smooth surfaces are formed on the perforated sheet material, and the advantage of stabilizing the materials laminated with the perforated material is lost, but the advantage of uniform consistent permeability is gained.

The various methods of producing these materials, such as punching operations, etc., also have their various advantages and disadvantages. Punching operations are generally impractical for producing minute apertures and piercing operations will only produce the flap type perforated sheet material. With the techniques utilized on the thermoplastic materials, where a portion of the thermoplastic material is melted away to form the perforations, very often a hard edge is left about the perforation which produces a rough feel in the final product. Also various methods and apparatus of the prior art have their limitations as to the spacing of the apertures and the size of the individual apertures.

In accordance with the method of the present invention, the perforated sheet material may be produced at great speeds with excellent control, both as to the size of aperture produced and as to spacing of apertures.

My new apertured sheet material may be produced with uniformly spaced and uniformly sized apertures. The apertures may vary in size from very minute to quite large. The perforated sheet material may be produced at great speeds with simple equipment, thus making my method extremely economical. In my sheet material there is no flap which tends to fall back and cover the aperture, thus preventing desired porosity. The new apertured sheet material of the present invention has one face which is smooth while the opposite face is roughened. On the roughened face a portion of the material initially in the aperture surrounds a portion of the periphery of the aperture. This material sticks out of the plane of the sheet material and is torn and shredded and is "set" in its configuration out of the plane of the sheet material. This flap portion has substantially no tendency to close the aperture, and in those instances where it is forced back into the aperture, it only closes a portion of the aperture.

The apertured sheet material of the present invention is made by supporting the material to be perforated at spaced areas over one surface allowing material to deflect or drape out of the general plane of the material between the supported spaced areas, and abrading the opposite surface at these spaced supported areas to scuff, disrupt and tear the sheet material in these spaced areas. A portion of the material in these areas is removed while the remainder is bent back about a portion of the periphery of the area. This bent back portion is "set" in its bent condition by the scuffing or tearing action, and in those instances where a thermoplastic sheet material is used, the heat produced by the scuffing or friction action tends to set the thermoplastic material into its bent back configuration to form uniformly sized perforations in the sheet material. The invention is carried into practice by passing the sheet material to be perforated through the nip formed by a pair of rotatable rolls. The surface of one of the rolls has raised projections, the ends of which are flat and have individual areas of from about .0001 square inch to 0.1 square inch or more. The sheet material, under slight tension, is allowed to deflect or drape down between projections. A cooperating roll has an abrading surface positioned to contact the flat area of the projections at the nip of the two rolls. The roll with the abrading surface rotates at a surface linear speed of at least about two times the surface linear speed of the roll having the raised projections. In operation those portions of the sheet material being supported by the raised projections are shredded or torn and abraded away; and a portion of the area is turned back out of the plane of the sheet material and "set" in this condition so that during subsequent use there is substantially no tendency for this portion of the sheet material to return to the perforation. The material between the projections is out of the plane of the abrading action and is substantially untouched by the abrading surface.

The invention will be more fully described when taken in conjunction with the accompanying drawings wherein:

FIGURE 5 is a perspective view of another form of apparatus for carrying the present invention into operation; and FIGURE 6 is a fragmental end view of the rolls of FIGURE 5 with parts in section.

Figure 1:
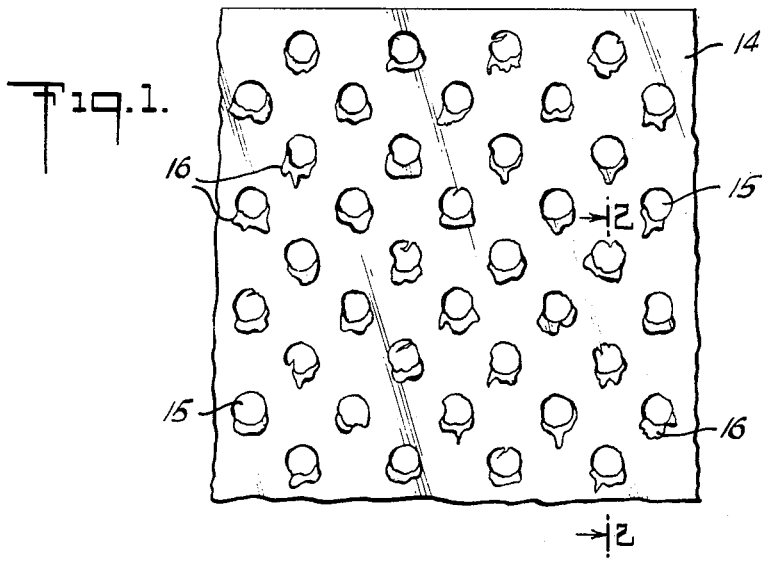
FIGURE 1 is a plan view of the apertured sheet material of the present invention.
Figure 2:
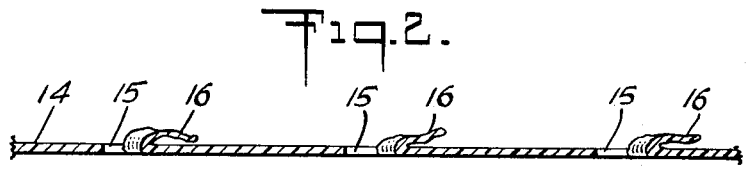
FIGURE 2 is an enlarged cross-sectional view of a portion of the sheet material shown in FIGURE 1 taken along line 2—2.

Referring to the drawings, in FIGURE 1 there is depicted an apertured sheet material 14 of the present invention. Areas of the sheet material have been torn, scuffed and shredded to produce apertures 15. Portions 16 of the material, previously in the apertures, now surround a portion of the periphery of each aperture. As more clearly shown in FIGURE 2 this material 16 is out of the general plane of the sheet material in more or less the form of a flap. The flap is not large enough to fill the aperture as a portion of the material has been abraded away.

Examples of various sheet materials which may be perforated in accordance with the present invention are paper, thermoplastic film, vinyl films, etc. The perforations may have a variety of shapes, such as round, elliptical, square, polygonal, or combinations thereof. Size and spacing of the perforations may also be varied.

Figure 3:
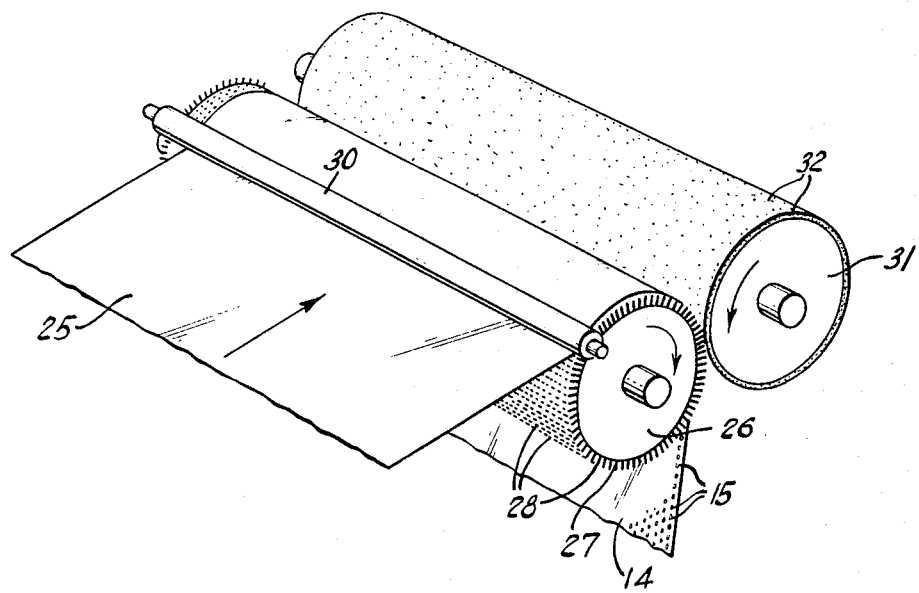
FIGURE 3 is a perspective view of one form of apparatus for practicing the present invention.
Figure 4:
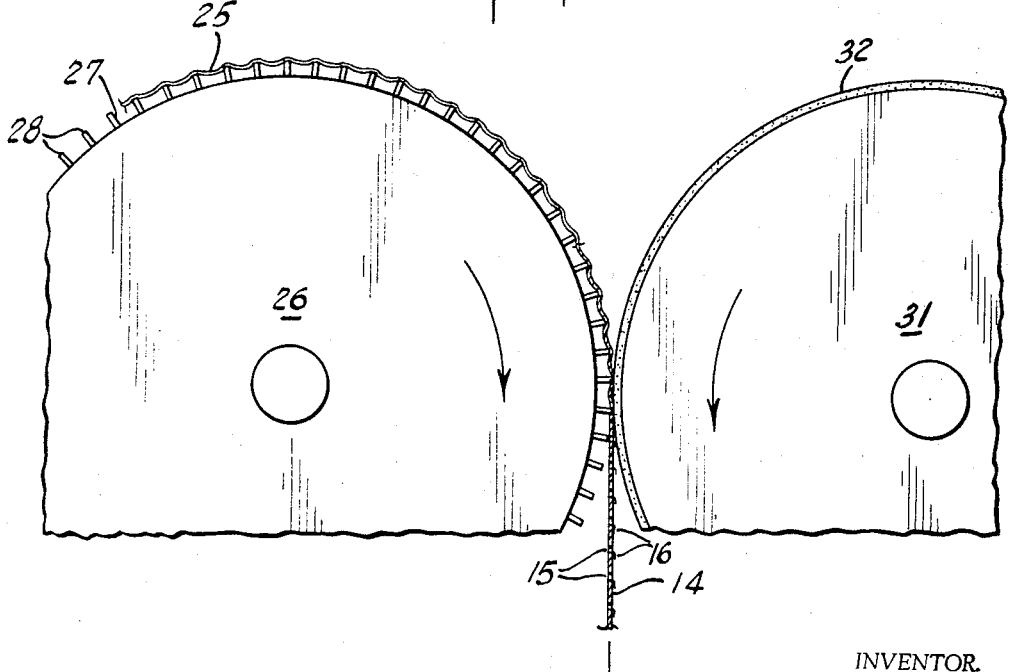
FIGURE 4 is a fragmental end view of the rolls of FIGURE 3 with parts in section.

Apparatus for perforating the sheet material in accordance with the present invention is depicted in FIGURE 3. The material 25 to be perforated is fed onto the surface of a rotating roll 26. The roll is covered with a number of raised projections 27, the ends of these projections having flat surfaces 28. The number of projections will depend upon the distribution of perforations desired in the final product. It is essential that there be sufficient flat area on these projections to support the film and the sheet material, not penetrated by these projections. Furthermore, the projections have a depth greater than the thickness of the sheet material being processed. Approximately 20,000 projections per square foot each having a flat area of 0.0007 square inch have been found suitable. However, projections ranging in number from about 100 per square foot to 150,000 per square foot having areas in the range of from about 0.0001 square inch to about 0.1 square inch also have been found suitable. Spacing of perforations will depend to a large extent on the flexibility of the sheet material being processed. The projections must be spaced far enough apart to allow the sheet material to drape down between the projections. In operation the film passes underneath roll 30 and is stretched about by tension on the surface of the raised projections. The film then passes through the nip formed by roll 31. The roll 31 is covered with an abrading surface 32, which as depicted in FIGURES 3 and 4, is an emery cloth type surface. The abrading roll operates at surface linear speeds from about two to fifty or more times as fast as the roll having the raised projections. The abrading roll scuffs, tears and abrades away a substantial portion of the sheet material in contact with the flat surfaces of the raised projection. That material which is not abraded away is bent back about a portion of the periphery of the perforation formed and on passing through the tight nip is set in its bent position so that uniform perforations are produced.

The sheet material actually is allowed to sag between the raised projections so that when abraded by the abrading roll only the portions of the film in contact with the outermost area of each projection is abraded away. The differential in speeds between the raised projection roll and the abrading roll will depend to a great extent on the sheet material being processed and the clarity desired in the perforations.

Referring to FIGURES 5 and 6, another embodiment of apparatus for carrying the invention into practice is depicted. A roll 35 having raised projections 36 cooperates with an abrading roll 37 to form a nip. The abrading roll is covered with pins 38 to produce approximately 70,000 points per square foot. The material 39 to be perforated is fed onto the surface of the raised projections and allowed to sag between projections. On passing through the nip formed by the raised projection roll and the abrading roll, the abrading roll rotating at a much faster speed abrades, tears, and scuffs that portion of the sheet material being held on the raised projection and perforations corresponding to the pattern of the raised projections are formed in the sheet material.

The roll having the raised projections may be made of any relatively rigid material. It is important that this surface be harder and more rigid than the abrading surface. The projections may be placed in any desired configuration providing there is suitable area so that the film or the sheet material to be processed is supported on the outer portion of these projections and is not penetrated by the projections, and there is room for the sheet material to sag between projections.

The abrading roll may be covered with any desired surface which will scuff or tear sheet material, such as emery, sand-blasted surfaces, pins, etc. It is preferable that the abrading material be somewhat less rigid than the raised projection roll. If desired the abrading roll may be patterned with an abrading surface so that patterns of apertures are formed in the material, such as horizontal lines, longitudinal lines, or diagonal lines, or any desired pattern.

It is important that the material to be perforated wrap around a portion of the roll having raised projections in order that the material to be perforated will deflect and drape between the raised projections, and hence that deflected portion of the material will not be worked on by the abrading roll, but will remain substantially intact.

In perforating sheet materials in accordance with the present invention, that portion of the material which is removed from the hole and is still left attached to the base sheet material is pressed or set in a bent back condition as it passes through the nip formed by the two rolls, and hence, during subsequent use it will not tend to re-enter the area of the perforation and close the perforation. Furthermore, if thermoplastic materials are being perforated, the friction accompanying the abrading action heat sets the bent back portion in its bent condition and substantially prevents it from returning to close the perforation.

The invention will be further illustrated in greater detail by the following specific examples. It should be understood, however, that although these examples may describe in particular detail some of the more specific features of the invention, they are given primarily for purposes of illustration, and the invention in its broader aspects is not to be construed as limited thereto.

In the drawings no driving means, such as motors, pulleys, belts, gears, sprockets, and the like have been illustrated for either roll. It must be understood that this has been done because such driving means are conventional and well known in the art. Furthermore, no frame or support means are shown and again, this is done because such are conventional and well known in the art. Additionally, the omission of these parts from the drawings makes the individual figures thereof less complicated and easier to read and to understand.

Example I

A one mil polyethylene film is taken from a let-off roll and passed under an idler roll so as to wrap around and contact a pattern roll. The pattern roll is 8 inches in diameter and is covered with fillet wire clothing No. 4R3R11N 1½ inches wide. The wire is No. 21 wire having approximately 160 points per square inch. Cooperating with this pattern roll is an abrading roll. The abrading roll is positioned to form a nip, and the abrading roll is covered with one hundredth fillet wire and having about 72,000 points per square foot. The wire is No. 32 and has a diameter of approximately .0128 inch. The rolls rotate in opposite directions and the abrading roll rotates at approximately 20 times the surface linear speed of the pattern roll. The film, after passing in contact with a portion of the surface of the pattern roll so that the film deflects between the wires, is passed between the nip formed by the abrading roll, and portions of the film corresponding to the points on the pattern roll are abraded away, scuffed and bent back. In the final film, the perforations are on approximately ⅛ inch centers. There are approximately 138 perforations per square inch. On one surface of the film about the periphery of each perforation, there is a small flap of scuffed up film. If this flap is pressed back into the area from which it was removed, and then released, it immediately folds back and opens the perforation. It appears that the friction evolved during the abrading action has partially set this flap in an open condition.

Example II

The procedure of Example I is followed as set forth therein with the exception that creped tissue paper having a 13 pound basis weight is substituted for the polyethylene film. The paper is perforated in the manner as described in conjunction with Example I and paper having approximately 138 perforations per square inch is produced. The perforations are uniformly spaced and uniform in size, and the portion of the paper surrounding the periphery of each perforation stays in its bent back condition and does not close perforations.

Example III

The procedure as outlined in Example I is followed as set forth therein with the exception that an abrading roll covered with a medium grade emery cloth is substituted for the fine toothed abrading roll of Example I. The abrading roll is set to just "kiss" the points of the pattern roll. Comparable results to those obtained in Example I are obtained in this example.

It should further be understood that the above examples are for the purposes of illustration only and are not to be used to delineate the breadth or scope of the invention. The invention is only limited by the scope of the claims appended hereto.

What is claimed is:

1. A method of perforating thermoplastic sheet material comprising: supporting said sheet material at spaced areas over one surface of said material and allowing said material to sag between said support areas, abrading the opposite surface at said supported areas to scuff and disrupt said material in said supported areas whereby perforations having portions of material from the perforation attached to the periphery of the perforation are formed in the sheet material, and simultaneously heat-setting said portions in a position out of the plane of said material.

2. A method of perforating thermoplastic sheet material comprising: supporting said sheet material at spaced areas over one surface of said material and allowing said sheet material to sag between said supported areas, abrading the opposite surface at said areas by applying rubbing forces in substantially one direction to scuff and disrupt said material in said supported areas whereby perforations having portions of material from the perforation attached to the periphery of the perforation are formed in the sheet material, and simultaneously heat-setting said portions in a position out of the plane of said material.

References Cited

UNITED STATES PATENTS

| | | | |
|---|---|---|---|
| 247,368 | 9/1881 | Lang | 51—281 |
| 404,581 | 6/1889 | Wheeler | 51—324 |
| 2,218,674 | 10/1940 | Eaton | 51—5 |
| 2,801,501 | 8/1957 | Marogg | 51—5 X |

LESTER M. SWINGLE, *Primary Examiner.*